US007646762B2

(12) United States Patent
Cai et al.

(10) Patent No.: US 7,646,762 B2
(45) Date of Patent: Jan. 12, 2010

(54) METHOD AND APPARATUS FOR PROVIDING SESSION DATA TO A SUBSCRIBER TO A MULTIMEDIA BROADCAST MULTICAST SERVICE

(75) Inventors: Zhijun Cai, N. Richland Hills, TX (US); Bonnie Chen, DeSoto, TX (US)

(73) Assignee: Motorola, Inc., Schaumburg, IL (US)

( * ) Notice: Subject to any disclaimer, the term of this patent is extended or adjusted under 35 U.S.C. 154(b) by 540 days.

(21) Appl. No.: 10/910,923

(22) Filed: Aug. 4, 2004

(65) Prior Publication Data
US 2005/0030966 A1 Feb. 10, 2005

Related U.S. Application Data

(60) Provisional application No. 60/492,676, filed on Aug. 6, 2003.

(51) Int. Cl.
*H04L 12/66* (2006.01)
(52) U.S. Cl. .................. 370/352; 370/312; 370/432; 370/329; 370/328; 455/552; 455/119; 455/464
(58) Field of Classification Search .................. 370/352, 370/312, 432, 329, 328, 337, 338; 455/552, 455/119, 464
See application file for complete search history.

(56) References Cited

U.S. PATENT DOCUMENTS

| 7,286,554 | B2* | 10/2007 | Beckmann et al. | .......... 370/432 |
| 2004/0085926 | A1 | 5/2004 | Hwang et al. | |
| 2004/0105402 | A1 | 6/2004 | Yi et al. | |
| 2005/0008159 | A1* | 1/2005 | Grilli et al. | .................. 380/270 |
| 2005/0083913 | A1* | 4/2005 | Choi et al. | .................. 370/352 |
| 2006/0109812 | A1* | 5/2006 | Kim et al. | .................. 370/329 |
| 2007/0287392 | A1* | 12/2007 | Sagne et al. | ................. 455/119 |

OTHER PUBLICATIONS

3GPP TR 23.846 1.0.0 (Jan. 2002), 3GPP Organization Partners, Release 6.*
"*BM-SC*: Handling of BM-SC Retransmission," 3GPP TSG-SA WG2 Meeting #34, Brussels, Belgium, Aug. 18-22, 2003, Motorola, Samsung Tdoc S2-03xxxx.
"Handling of BM-SC Retransmission," 3GPP TSG-SA WWG2 Meeting #34, Brussels, Belgium Aug. 18-22, 2003, Motorola, Samsung, Tdoc S2-03xxxx.
"3rd Generation Partnership Project: Technical Specification Group Services and System Aspects; Multimedia Broadcast/Multicast Service (MBMS); Architecture and Functional Description (Release 6)", 3GPP TS 23.246 v.1.1.0 (Jul. 2003) Technical Specification, pp. 1-33.

* cited by examiner

*Primary Examiner*—Matthew D Anderson
*Assistant Examiner*—Minh D Dao
(74) *Attorney, Agent, or Firm*—Steven A. May (57) ABSTRACT

A communication system that includes a Multimedia Broadcast Multicast Service (MBMS) service provides re-broadcasts of an event to subscribers to the MBMS service. An infrastructure included in the communication system and comprising a server coupled to a RAN controller via a support node receives a first set of MBMS data from an MBMS content provider and conveys the first set of MBMS data along with an associated first Session Description to a subscribed mobile station. The infrastructure then receives a second set of MBMS data from the MBMS content provider, wherein the second set of MBMS data comprises a re-conveyance of the first set of MBMS data, and conveys an MBMS notification along with an associated second Session Description to the mobile station. The mobile station may then determine whether to receive the re-conveyance based on the first and second Session Descriptions.

32 Claims, 7 Drawing Sheets

METHOD AND APPARATUS FOR PROVIDING SESSION DATA TO A SUBSCRIBER TO A MULTIMEDIA BROADCAST MULTICAST SERVICE

CROSS-REFERENCE(S) TO RELATED APPLICATION(S)

The present application claims priority from provisional application Ser. No. 60/492,876, entitled "METHOD AND APPARATUS FOR PROVIDING SESSION DATA TO A SUBSCRIBER TO A MULTIMEDIA BROADCAST MULTICAST SERVICE," filed Aug. 6, 2003, which is commonly owned and incorporated herein by reference in its entirety.

FIELD OF THE INVENTION

The present invention relates generally to packet data communication systems, and, in particular, to a multimedia broadcast multicast service in a packet data communication system.

BACKGROUND OF THE INVENTION

The Universal Mobile Telecommunication Service (UMTS) standard provides a compatibility standard for cellular mobile telecommunications systems. The UMTS standard ensures that a mobile station (MS), or user equipment (UE), operating in a UMTS system can obtain communication services when operating in a system manufactured according to the standard. To ensure compatibility, radio system parameters and data transfer procedures are specified by the standard, including protocols governing digital control messages and bearer traffic that are exchanged over an air interface.

The UMTS standards provide, in 3GPP TS 25.346 (Third Generation Partnership Project Technical Specification 25.346) v0.5.0, 3GPP TS 23.246 v1.1.0, and 3GPP TS 23.846 v6.0.0, for a provision of a Multimedia Broadcast Multicast Service (MBMS) service by a UMTS communication system to MSs serviced by the system and subscribed to the service. When the MBMS service has MBMS data for conveyance to subscribers to the service, a Radio Network Controller (RNC) included in a Radio Access Network (RAN) of a UMTS infrastructure determines whether to establish a Point-To-Multipoint (PTM) communication channel in a cell or a Point-To-Point (PTP) communication channel to each UE in the cell. The RNC then broadcasts a MBMS notification via a Node B included in the RAN, typically a base transceiver station (BTS), and a control channel to all UEs in the cell. The notification typically includes an identifier associated with the MBMS service. In response to receiving the MBMS notification, each MS in the cell that subscribes to the MBMS service and is in idle mode wakes up. In addition, in response to receiving the MBMS notification, each MS in the cell that subscribes to the MBMS service conveys a connection request, typically a Radio Resource Control (RRC) connection establishment request, to the RNC via an access channel. Upon receiving the connection requests from each of the subscribing MSs, the RNC sets up a communication session by establishing a PTM communication channel or PTP communication channels with each responding MS, whichever the RNC has determined to establish, and conveys the MBMS data to the subscribing MSs over the established channel or channels.

One use of MBMS services may be to broadcast an event that includes multiple communication sessions. For example, a subscriber to an MBMS service may subscribe to a specific event, such as a soccer game. Rather than provide a continuous broadcast of the event, the MBMS service then broadcasts the event via multiple communication sessions, wherein each communication session of the multiple communication sessions concerns a separate aspect of the event, such as a video clip or text concerning of each of multiple goals, periodic score updates, and/or periodic game highlights. Each communication session of the multiple communication sessions is separately set up and provides for conveyance of MBMS data to subscribers to the event. However, a problem may arise when a subscriber to the event is outside a coverage area of the MBMS service for one or more of the multiple communication sessions or fails to acceptably receive data during one or more of the communication sessions, resulting in an incomplete transmission of data concerning the event to the subscriber. A further issue is how to re-convey data to a subscriber who wishes to view a replay of a clip or text.

In order to provide a subscriber to the event with more complete coverage of an event, concepts have been proposed for providing missing data or replays of data to subscribers to the event. In one proposal, an MS may request a replay based on a Session Identifier (Session ID). In this proposal, a Session ID is generated by an MBMS content provider or by an intermediate network element between the content provider and the RNC for each communication session of the multiple communication sessions. For example, a first communication session, such as a first goal, may be associated with a Session ID of '1,' a second communication session, such as a second goal, may be associated with a Session ID of '2,' and so on. The Session ID is then embedded by the network element generating the ID in a data packet associated with the communication session.

When the RNC receives data packets associated with a communication session, the RNC detects the embedded Session ID and stores the Session ID in association with the data packets. The RNC then broadcasts the MBMS data packets to the subscribers to the service. Upon receiving the data packets, an MS parses the data packets to obtain the Session ID and stores the Session ID. When a user of the MS wishes to see a replay of the text or video clip associated with the Session ID, the user pulls up a menu of stores Session IDs. The user then selects a Session ID from the menu of stored Session IDs and conveys the selected Session ID to the RNC. The RNC then re-conveys the data packets stored in association with the selected Session ID to the MS, thereby allowing the MS to replay the data for the user.

The use of Session IDs poses several problems. For one, the Session ID is not very descriptive of the communication session and may not provide the user of the UE with sufficient information for selecting a replay. For another, the RNC must detect and store Session IDs and further store data associated with each stored Session ID. This violates an expressed goal of MBMS service that replays and retransmissions of data should be transparent to the RAN. The use of Session IDs may also impose significant data storage requirements upon an RNC as MBMS services increase in popularity. In addition, the proposed use of Session IDs presents inter-layer, that is, inter-OSI layer, issues for the RNC and MS. The RNC would have to know the Session ID associated with a replay, and the MS will require higher and lower layer interaction in order to determine session status. By contrast, the OSI layers were established to separate functions performed by a communication device. Furthermore, the use of Session IDs to replay MBMS data does not assist late joiners to an event, that is, those who outside the coverage area of the MBMS service until after the event has begun, select a replay when they have missed earlier broadcasts of the event.

Another proposal is to provide missing data or replays of data based on a Sequence Identifier (Sequence ID). Similar to the Session IDs, a Sequence ID is generated by an MBMS content provider or by an intermediate element between the content provider and the RNC with respect to each communication session. For example, a first communication session, such as a first goal, may be associated with a Sequence ID of '1,' a second communication session, such as a second goal, may be associated with a Sequence ID of '2,' and so on. However, unlike the Session IDs, the Sequence IDs must be sequential and must be provided with each communication session. The Sequence ID is then embedded by the network element generating the Sequence ID in a data packet associated with the communication session.

When the RNC receives data packets associated with a communication session, the RNC detects the Sequence ID and stores the Sequence ID in association with the data packets. The RNC then broadcasts the MBMS data to the subscribers to the service. Upon correctly receiving a data broadcast, an MS parses the received data packets to obtain the Sequence ID and stores the Sequence ID, thereby storing a record of the received data. The MS may then determine, based on a gap in the stored Sequence IDs, whether a communication session has been missed and, upon determining that a communication session has been missed, convey the missing Sequence ID to the RNC. Upon receiving the Sequence ID from the MS, the RNC then retrieves the data associated with the Sequence ID and conveys the retrieved data to the MS.

The use of a Sequence ID poses many of the same problems as the use of the Session ID. In addition, the use of a Sequence ID has a drawback that late joiners to the event cannot obtain earlier data broadcasts, since Sequence IDs associated with the earlier data broadcasts are unknown to the UE.

Therefore, a need exists for a method and apparatus that provides for replays of MBMS data and for re-conveyance of missing MBMS data in a manner that is transparent to a RAN, that does not require inter-layer interaction, and that supports conveyance of missed MBMS data to late joiners to an event.

DETAILED DESCRIPTION OF THE INVENTION

To address the need for a method and an apparatus that that provides for replays of MBMS data and for re-conveyance of missing MBMS data in a manner that is transparent to a RAN, that does not require inter-layer interaction, and that supports conveyance of missed MBMS data to late joiners to an event, a communication system is provided that includes a Multimedia Broadcast Multicast Service (MBMS) service and that provides re-broadcasts of an event to subscribers to the MBMS service. An infrastructure included in the communication system and comprising a server coupled to a RAN controller via a support node receives a first set of MBMS data from an MBMS content provider and conveys the first set of MBMS data along with an associated first Session Description to a subscribed mobile station. The infrastructure then receives a second set of MBMS data from the MBMS content provider, wherein the second set of MBMS data comprises a re-conveyance of the first set of MBMS data, and conveys an MBMS notification along with an associated second Session Description to the mobile station. The mobile station may then determine whether to receive the re-conveyance based on the first and second Session Descriptions.

Generally, an embodiment of the present invention encompasses a method for providing MBMS data to a subscriber to a Multimedia Broadcast Multicast Service (MBMS) service. The method includes receiving a first set of MBMS data from an MBMS content provider and conveying the first set of MBMS data to a mobile station associated with a subscriber to the MBMS service. The method further includes receiving a second set of MBMS data from the MBMS content provider, wherein the second set of MBMS data comprises a re-conveyance of the first set of MBMS data and conveying an MBMS notification that identifies the second set of MBMS data as a re-conveyance of the first set of MBMS data.

Another embodiment of the present invention encompasses an apparatus for providing MBMS session data to a subscriber to the MBMS service. The apparatus includes a server that that receives a first set of MBMS data from an MBMS content provider, conveys the first set of MBMS data along with an associated first Session Description, receives a second set of MBMS data from the MBMS content provider, wherein the second set of MBMS data comprises a re-conveyance of the first set of MBMS data, and conveys the second set of data along with an associated second Session Description, wherein the second Session Description identifies the second set of data as a re-conveyance of the first set of data.

Yet another embodiment of the present invention encompasses a mobile station capable of accessing an MBMS service. The mobile station includes a processor that receives a first set of MBMS data and an associated first Session Description, stores the first Session Description to produce a stored first Session Description, receives a second Session Description associated with a re-conveyance of the first set of data, and determines whether to receive the re-conveyance based on the first Session Description and the second Session Description.

Still another embodiment of the present invention encompasses a method of receiving data from a MBMS service. The method includes receiving a first set of MBMS data and an associated first Session Description, storing the first Session Description to produce a stored first Session Description, receiving an MBMS notification comprising a second Session Description, in response to receiving the MBMS notification, prompting a user of a mobile station, and determining whether to accept the MBMS notification based on a response of the user to the prompt.

Yet another embodiment of the present invention encompasses a method of receiving data from an MBMS service. The method includes receiving a first set of MBMS data and an associated first Session Description, storing the Session Description to produce a stored Session Description, receiving an MBMS notification associated with a re-conveyance of the first set of MBMS data and comprising a second Session Description, and determining whether to receive the re-conveyance of the first set of MBMS data based on the second Session Description.

Figure 1:
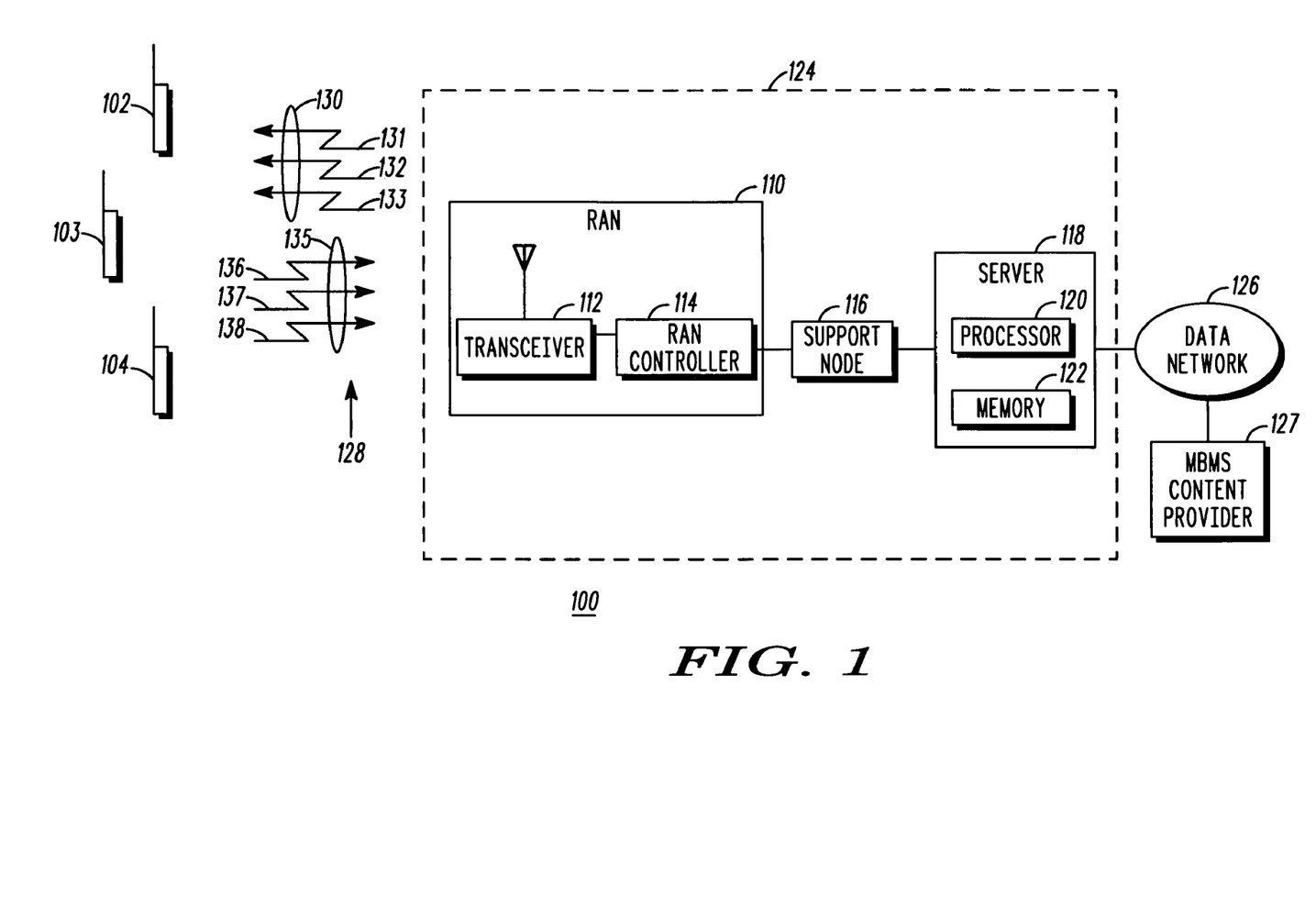
FIG. 1 is a block diagram of a wireless communication system in accordance with an embodiment of the present invention.

The present invention may be more fully described with reference to FIGS. 1-4C. FIG. 1 is a block diagram of a wireless communication system 100 in accordance with an embodiment of the present invention. Communication system 100 includes multiple mobile stations (MSs), or user equipment (UE), 102-104 (three shown), such as but not limited to a cellular telephone, a radio telephone, a personal digital assistant (PDA) with radio frequency (RF) capabilities, or a wireless modem that provides RF access to digital terminal equipment (DTE) such as a laptop computer or a personal computer (PC), in wireless communication with a Radio Access Network (RAN) 110. RAN 110 includes at least one transceiver, or Node B, 112 that is operably coupled to a RAN controller 114, preferably a Radio Network Controller (RNC). Communication system 100 further includes a support node 116 coupled to RAN 110 and a server 118, preferably a Broadcast Multicast Service Center (BM-SC), in communication with RAN controller 114 via the support node. Support node 116 typically includes one or more Serving 3G-GPRS Support Nodes (SGSNs) that are each coupled to one or more 3G-Gateway GPRS Support Nodes (GGSNs). However, the precise architecture of support node 116 is up to an operator of communication system 100 and is not critical to the present invention. Together, RAN 110, support node 116, and server 118 are collectively referred to herein as an infrastructure 124.

Each of MSs 102-104 subscribes to, that is, is associated with a user that subscribes to, a Multimedia Broadcast Multicast Service (MBMS) service provided by communication system 100, which service provides for a distribution of MBMS data to the MSs. MBMS services are described in detail in the 3GPP (Third Generation Partnership Project) standards, and in particular 3GPP TS (Technical Specification) 25.346 v0.5.0, 3GPP TS 23.846 v6.0.0, 3GPP TS 22.146 v6.0.0, 3GPP TS 23.246 v1.1.0, 3GPP TR (Technical Report) 21.905 v5.4.0, and Report R2-030063, which specifications and reports are hereby incorporated by reference herein and copies of which may be obtained from the 3GPP via the Internet or from the 3GPP Organization Partners' Publications Offices at Mobile Competence Centre 650, route des Lucioles, 06921 Sophia-Antipolis Cedex, France.

RAN 110 provides communications services to mobile stations, such as MS 102-104, located in a coverage area, such as a cell, serviced by the RAN via an air interface 128. Air interface 128 comprises a downlink 130 and an uplink 135 that each includes multiple communication channels. Preferably, downlink 130 includes a paging channel 131, at least one downlink control channel 132, and at least one downlink traffic channel 133. Preferably, uplink link 135 includes an uplink access channel 136, at least one uplink control channel 137, and at least one uplink traffic channel 138.

Figure 2:
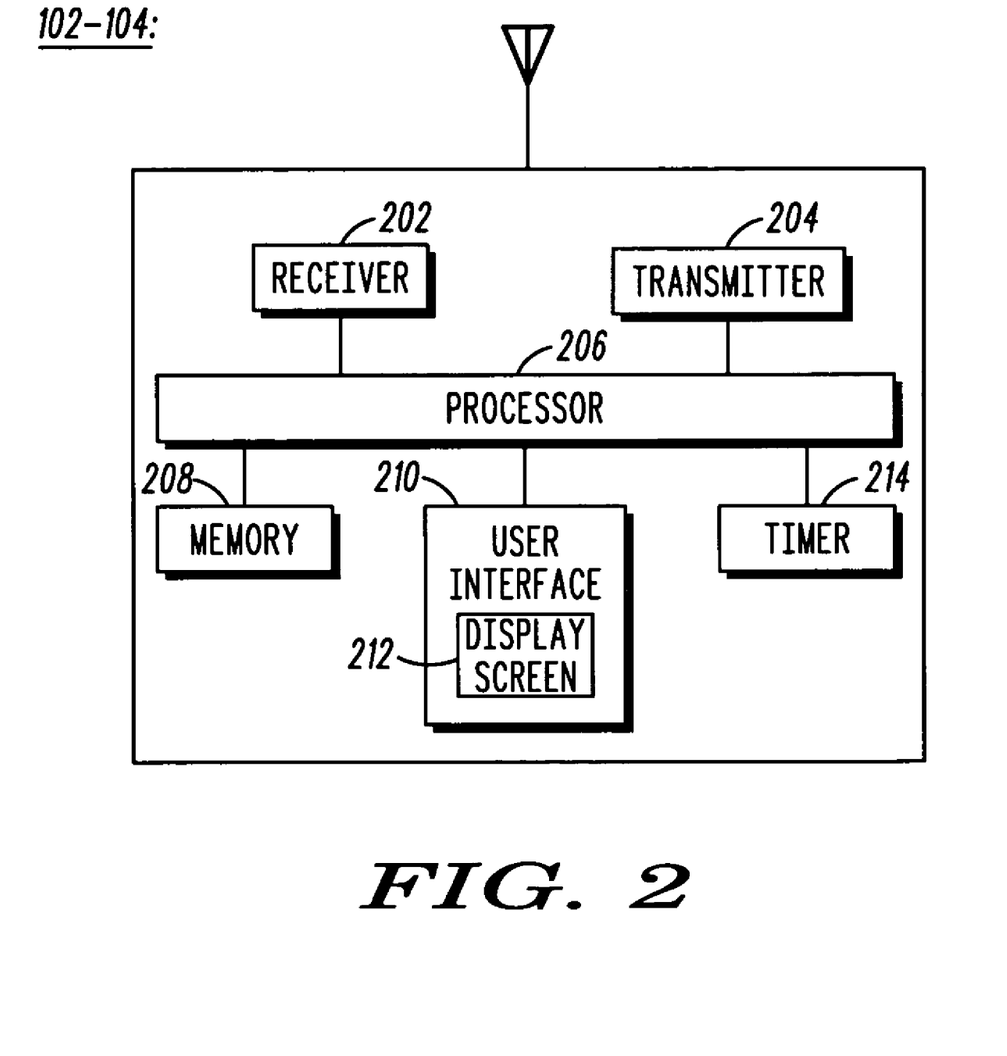
FIG. 2 is a block diagram of a mobile station of FIG. 1 in accordance with an embodiment of the present invention.

Referring now to FIGS. 1 and 2, server 118 and each of MSs 102-104 includes a respective processor 120, 206 such as one or more microprocessors, microcontrollers, digital signal processors (DSPs), combinations thereof or such other devices known to those having ordinary skill in the art. Server 118 and each of MSs 102-104 further includes a respective one or more memory devices 122, 208 associated with the respective processor, such as random access memory (RAM), dynamic random access memory (DRAM), and/or read only memory (ROM) or equivalents thereof, that store data and programs that may be executed by the processor and allow the processor to operate in communication system 100. The one or more memory devices 208 of each MS 102-104 further maintains a mobile identifier (mobile ID) associated with the MS and a Service Identifier (Service ID) associated with the MBMS service subscribed to by the MS. The one or more memory devices 122 of server 118 further maintains the mobile IDs associated with each MS that subscribes to the MBMS service and the Service ID associated with the MBMS service.

Each of MSs 102-104 further includes a receiver 202, a transmitter 204, and user interface 210 that are operably coupled to processor 206. Receiver 202 and transmitter 204 respectively provide for receiving and transmitting messages by the MS. User interface 210 includes a display screen 212 and provides a user of the MS with the capability of interacting with the MS, including inputting instructions into the MS. In one embodiment of the present invention, user interface 210 may further include a keypad that includes multiple keys via which a user of the MS may input an instruction to the MS. In another embodiment of the present invention, display screen 212 may comprises a touch screen that is able to determine a position (i.e., an X-coordinate and a Y-coordinate) of a user's touch on the touch screen and convey the position data to processor 206. Based on the position data, processor 206 then translates the user's touch into an instruction. Preferably, the touch screen may display a "keypad" screen that comprises multiple softkeys such softkeys corresponding to keys on a conventional telephone keypad.

Preferably, communication system 100 is a Universal Mobile Telecommunication Service (UMTS) communication system that operates in accordance with the 3GPP (Third Generation Partnership Project) standards, which provide a compatibility standard for UMTS air interfaces and which standards are hereby incorporated herein in their entirety. The standards specify wireless telecommunications system operating protocols, including radio system parameters and call processing procedures. In communication system 100, the communication channels of downlink link 130 or uplink link 135, such as access channels, control channels, paging channels, and traffic channels, each comprises one or more of multiple time slots in a same frequency bandwidth. However, those who are of ordinary skill in the art realize that communication system 100 may operate in accordance with any wireless telecommunication system, such as but not limited to a General Packet Radio Service (GPRS) communication system, a Code Division Multiple Access (CDMA) 2000 communication system, a Time Division Multiple Access (TDMA) communication system, or an Orthogonal Frequency Division Multiple Access (OFDM) communication system.

Communication system 100 further includes a Multimedia Broadcast Multicast Service (MBMS) content provider 127, such as an Internet Protocol (IP) multicast server, that is coupled to infrastructure 124, and in particular to server 118, via a data network 126, such as an IP network. As part of the MBMS service subscribed to by each of MSs 102-104, MBMS content provider 127 sources MBMS data, typically in the form of IP data packets, to MSs 102-104 via server 118, support node 116, and RAN 110.

As part of the MBMS service subscribed to by each MS 102-104, the MS can subscribe to an MBMS broadcast of an event, such as an athletic event, for example, a soccer game, a baseball game, or a football game, a concert event, or any other type of entertainment event or other event that may be broadcast, which broadcast may include one or more communication sessions during which data concerning the event is conveyed to the subscribing MS. In the prior art proposals, a missed communication session of the one or more communication sessions may be re-conveyed to an MS only if the missed session occurs after the MS has joined the broadcast. Furthermore, in the prior art proposals, a Radio Network Controller must store and re-convey any missed sessions. In contrast, communication system 100 provides for a late joining MS to obtain communication sessions that were broadcast prior to the MS joining the broadcast and further provides a scheme for a re-conveyance of an MBMS communication session that is transparent to a RAN.

Figure 3A:
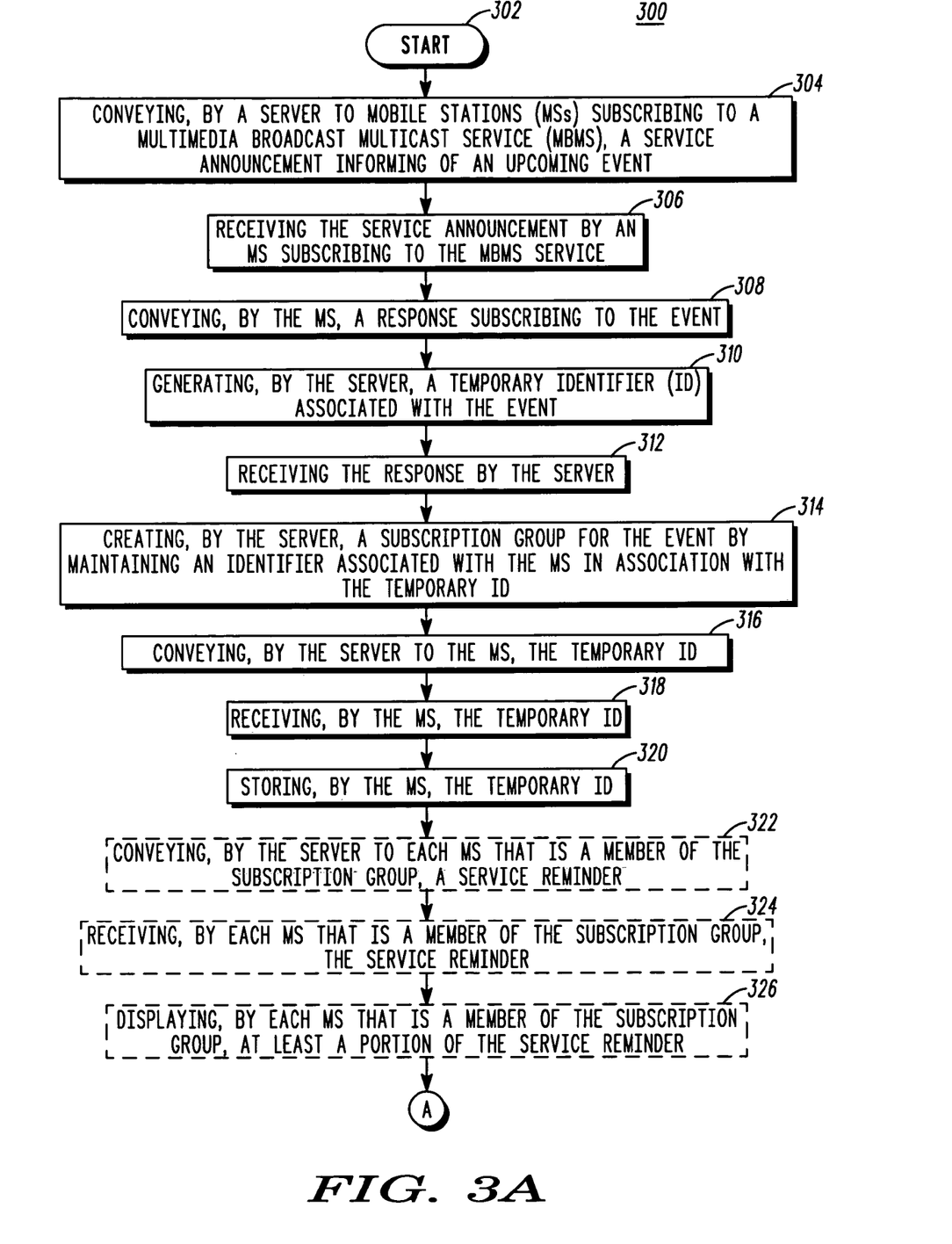
FIG. 3A is a logic flow diagram of a method by which a mobile station (MS) of FIG. 1 that subscribes to a Multimedia Broadcast Multicast Service (MBMS) provided by the communication system of FIG. 1 participates in an MBMS broadcast of an event in accordance with an embodiment of the present invention.
Figure 3B:
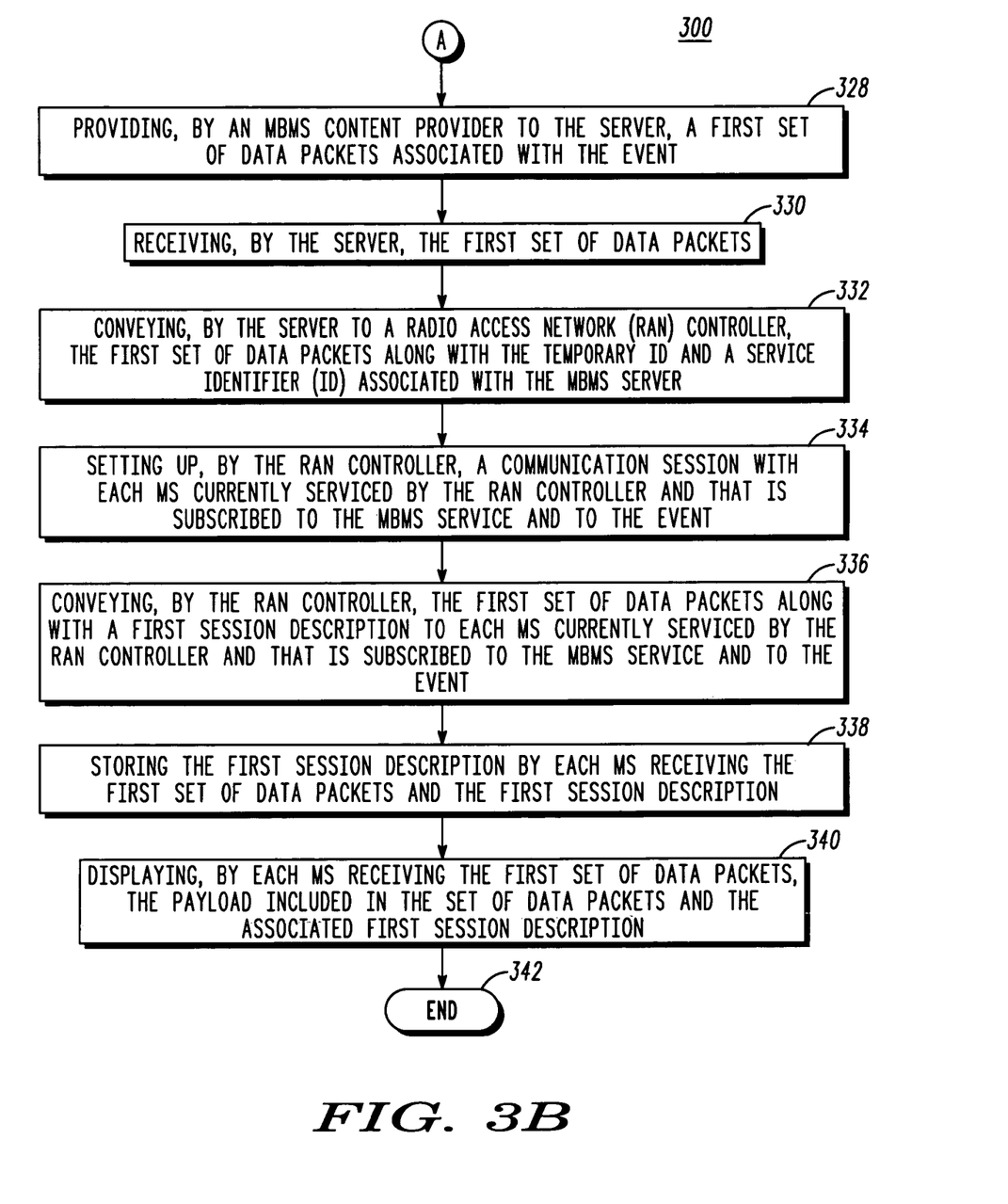
FIG. 3B is a continuation of the logic flow diagram of FIG. 3A depicting a method by which an MS of FIG. 1 that subscribes to an MBMS service provided by the communication system of FIG. 1 participates in an MBMS broadcast of an event in accordance with an embodiment of the present invention.

FIGS. 3A and 3B depict a logic flow diagram 300 of a method by which an MS 102-104 that subscribes to an MBMS service provided by communication system 100 participates in an MBMS broadcast of an event in accordance with an embodiment of the present invention. Logic flow diagram 300 begins (302) when communication system 100, and in particular server 118, conveys (304) a service announcement concerning the event to each MS 102-104 subscribing to the MBMS service. The service announcement may be sent in any over-the-air format, such as via a broadcast over paging channel 131, via a short message service (SMS), or via a multicast. The service announcement comprises information concerning the event, which information may be used by a user of an MS to determine whether to subscribe to the event. The information may include one or more of the Service ID associated with the MBMS service, a routing address, such as an Internet Protocol (IP) address, associated with the MBMS content provider 127 sourcing the data related to the event, a subject category, such as "sports" and/or more specifically "soccer" when the event is a soccer game, concerning the subject matter of the event, an event title, such "World Cup Game No. 1," and a date and a time of the event.

In response to receiving (306) the service announcement, an MS 102-104 subscribing to the MBMS service determines that it is an intended recipient of the announcement based on the Service ID included in the announcement. When the MS then desires to subscribe to the event, the MS conveys (308) a subscription response to infrastructure 124, and in particular server 118. When the MS does not desire to subscribe to the event, the MS does not respond to the announcement, other than, perhaps, to acknowledge receipt of the announcement.

In one embodiment of the present invention, an MS 102-104 may automatically respond to the announcement based on a program stored in the one or more memory devices 208 or based on information programmed into the memory devices by a user of the MS. For example, the MS may be programmed to affirmatively reply to any subscription announcement with a subject category of "sports" or "soccer" and/or subject matter/event title that includes the phrase "World Cup." In another embodiment of the present invention, at least a portion of the information included in the service announcement may be displayed on display screen 212 of user interface 210, such as "World Cup Game No. 1" along with the date and time of the event. The MS may further display on display screen 212 instructions on how to subscribe, such as text or a softkey that the user may select or a key of a keypad that a user may depress to generate a response. A user of the MS may then subscribe to the event by selecting the indicated text, softkey, or key. In response to a user's selection of the indicated text, softkey, or key, the MS conveys a response to server 118 indicating a desire of a user of the MS to subscribe to the event. Included in the response is the mobile ID uniquely associated with the MS, allowing server 118 to determine the source of the response.

Server 118 further generates (310) a temporary identifier (ID), preferably a Temporary Mobile Group Identifier (TMGI), associated with the event. The temporary ID may be maintained in the one or more memory devices 122 of server 118 and may be derivative of other information related to the event, such as a shortened version of the MBMS Service ID or of the routing address associated with MBMS content provider 127. Upon receiving (312) a response from an MS 102-104 subscribing to the event, server 118 creates (314) a subscription group associated with the event by storing, in the one or more memory devices 122 of the server, the mobile ID associated with each responding MS in association with the temporary ID associated with the event.

Server 118 further conveys (316) the temporary ID associated with the event to the MS. Similar to the service announcement, the temporary ID may be conveyed via any over-the-air format, such as via a broadcast over a paging channel, via a short message service (SMS), or via a multicast, and is included in a message that includes the mobile ID associated with the MS subscribing to the event, allowing the MS to determine that it is an intended recipient of the temporary ID. Upon receiving (318) the temporary ID, the MS stores (320) the temporary ID in the one or more memory devices 208 of the MS. Unless otherwise specified herein, all functions described as being performed herein by an MS 102-104 are performed by the processor 206 of the MS, and all functions described as being performed herein by server 118 are performed by the processor 120 of the server.

Subsequent to conveying the service announcement and prior to the occurrence of the event, server 118 may convey (322) a service reminder to each MS that has subscribed to the event. Similar to the service announcement, the service reminder may include one or more of the Service ID associated with the MBMS service, the routing address of MBMS content provider 127, and information concerning the event, such as the subject category, the event title, and the data and time of the event. The service reminder further includes the temporary ID assigned to the subscription group so that each MS subscribing to the event can determine that it is an intended recipient of the service reminder. Upon receiving (324) the service reminder, each MS 102-104 that is a member of the subscription group displays (326) at least a portion of the information included in the service reminder on the display screen of user interface 210 for review by a user of the MS.

Upon initiation of the event, MBMS content provider 127 provides (328) to server 118, and the server receives (330) from the MBMS content provider, a first set of data packets comprising payload data associated with the event, such as a score, a highlight, and/or a video clip. In response to receiving the first set of data packets, server 118 conveys (332) the set of data packets, along with the Service ID associated with the MBMS service, the temporary ID assigned to the event, and a first 'Session Description' associated with the payload included in the data packets, to RAN controller 114. The Service ID and the temporary ID are added to the data packets by the server 118. The 'Session Description' is a word or a phrase that is descriptive of the payload included in the set of data packets, such as "goal 1," "goal 2," and so on. In one embodiment of the present invention, the 'Session Description' may be added to the set of data packets by server 118. In another embodiment of the present invention, MBMS content provider 127 may add the 'Session Description' to the set of data packets.

In response to receiving the set of data packets and associated Service ID and temporary ID, RAN controller 114 sets up (334) a communication session with each MS 102-104 that is currently serviced by the RAN controller and that is subscribed to the MBMS service and to the event. RAN controller 114 sets up the communication session in accordance with well-known MBMS communication session set up techniques, except that as part of the process of setting up the communication session the RAN controller additionally conveys to each MS the temporary ID assigned to the subscription group and the first Session Description describing the payload.

For example, in one embodiment of the present invention, the step of setting up (334) the communication session may include the following steps. RAN controller 114 broadcasts a first MBMS notification, via transceiver 112 and downlink control channel 132, to all MSs serviced by the RAN. The first notification includes an identifier associated with the MBMS service, the temporary ID assigned to the subscription group, and the first Session Description associated with the received set of MBMS data. In response to receiving the first MBMS notification, each MS that is subscribed to the MBMS service and the event and is in idle mode wakes up. In addition, in response to receiving the first MBMS notification, each MS 102-104 subscribed to the MBMS service and to the event further checks the one or more memory devices 208 of the MS to determine if the first Session Description, included in the first notification, matches a Session Description maintained in the one or more memory devices. When no match is found, each MS in the cell that is subscribed to the MBMS service and that receives the first notification conveys a connection request, typically a Radio Resource Control (RRC) connection establishment request, to RAN controller 114 via an access channel. Upon receiving the connection requests from each of the subscribing MSs, RAN controller 114 sets up a communication session by establishing a PTM communication channel or PTP communication channels with each responding MS, whichever the RAN controller has determined to establish.

Upon establishing the PTM communication channel or PTP communication channels, RAN controller 114 then conveys (336) the first set of data packets to the subscribing MSs 102-104 via the established channel or channels. Upon receiving the first set of data packets, each MS 102-104 stores (338), in the one or more memory devices 208 of the MS, the first Session Description included in the set of data packets and displays (340) the first Session Description and the payload, such as the score or video clip, included in the set of data packets on the display screen 212 of user interface 210. Logic flow diagram 300 then ends (342).

In order to provide for replays of MBMS data and for re-conveyance of missing MBMS data in a manner that is transparent to a RAN, that does not require inter-layer interaction, and that supports conveyance of missed MBMS data to MSs that join an event subsequent to the establishment of one or more communication sessions, communication system 100 provides for an automatic re-conveyance of event-related data packets by MBMS content provider 127. By re-conveying the data packets, each MS subscribing to the event is provided with an opportunity to capture missed data packets or to replay the information of earlier received data packets. The re-conveyance may occur at any time after the initial conveyance of the data but preferably is sufficiently distant in time from the initial conveyance to capture most late joiners to the group and to allow for those who have temporarily left a coverage area of communication system 100 to return to the system's coverage area.

Figure 4A:
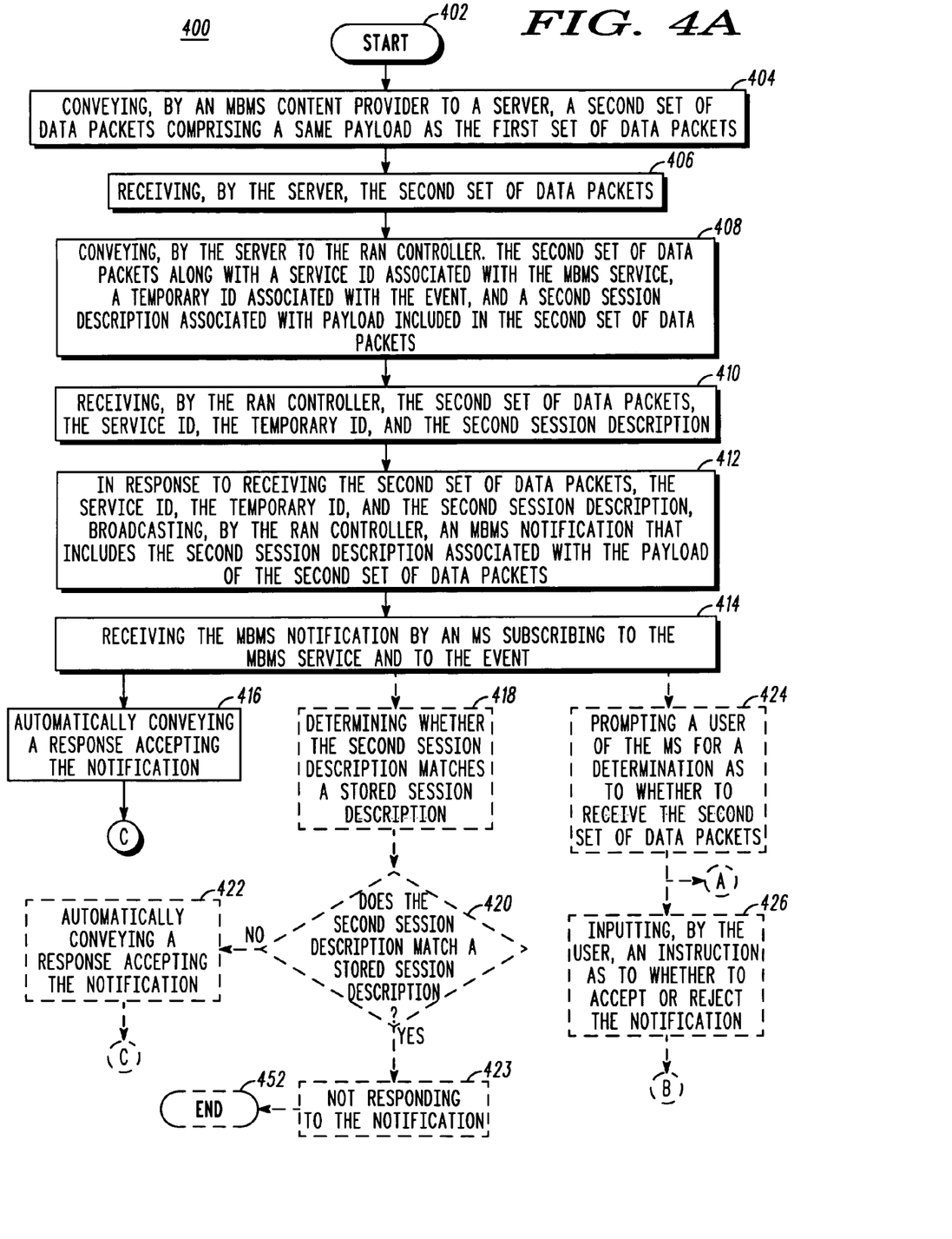
FIG. 4A is a logic flow diagram of a re-conveyance, by the communication system of FIG. 1, of a set of data packets associated with an earlier communication session to an MS of FIG. 1 in accordance with various embodiments of the present invention
Figure 4B:
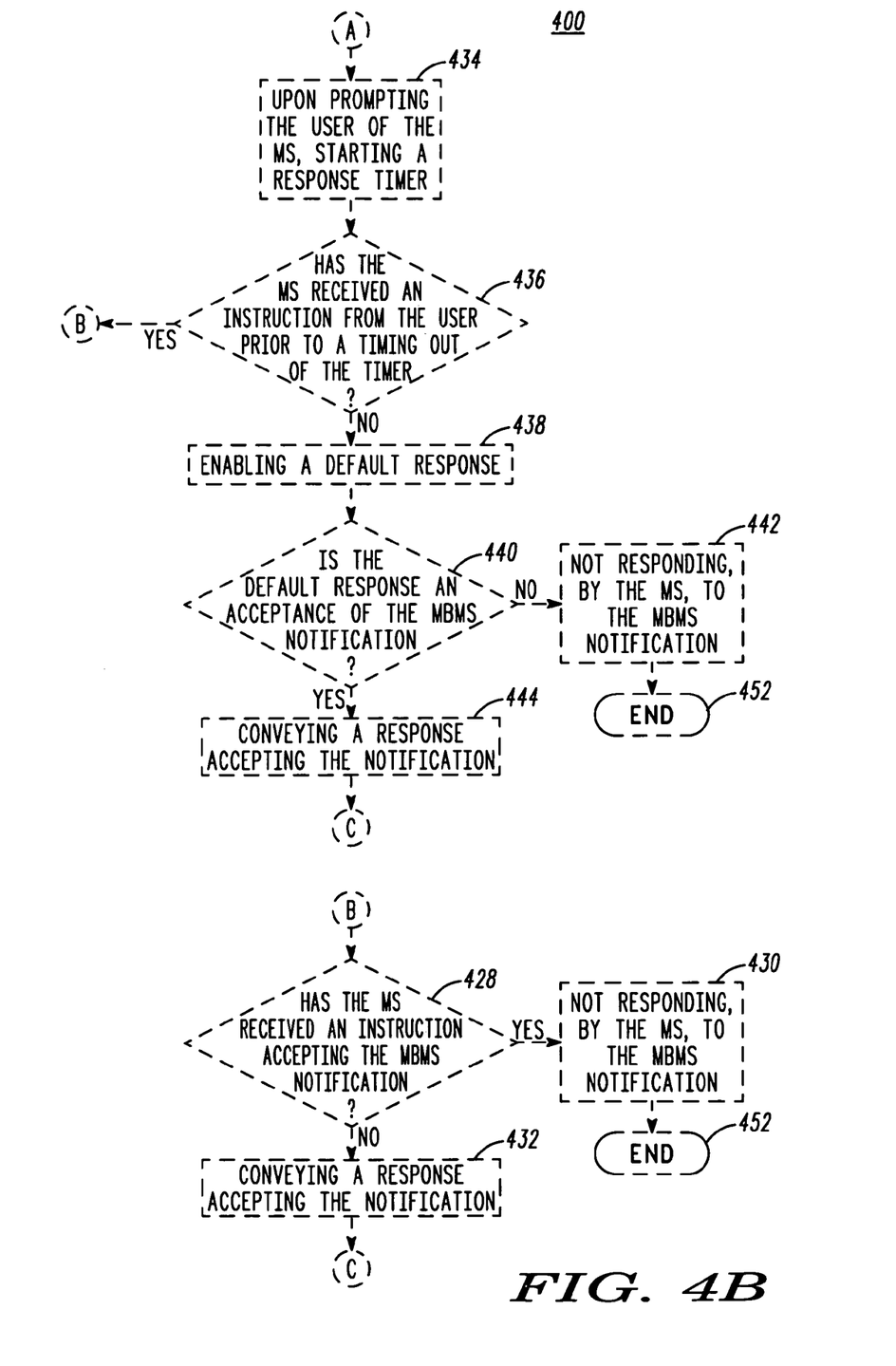
FIG. 4B is a continuation of the logic flow diagram of FIG. 4A depicting a re-conveyance, by the communication system of FIG. 1, of a set of data packets associated with an earlier communication session to an MS of FIG. 1 in accordance with various embodiments of the present invention.
Figure 4C:
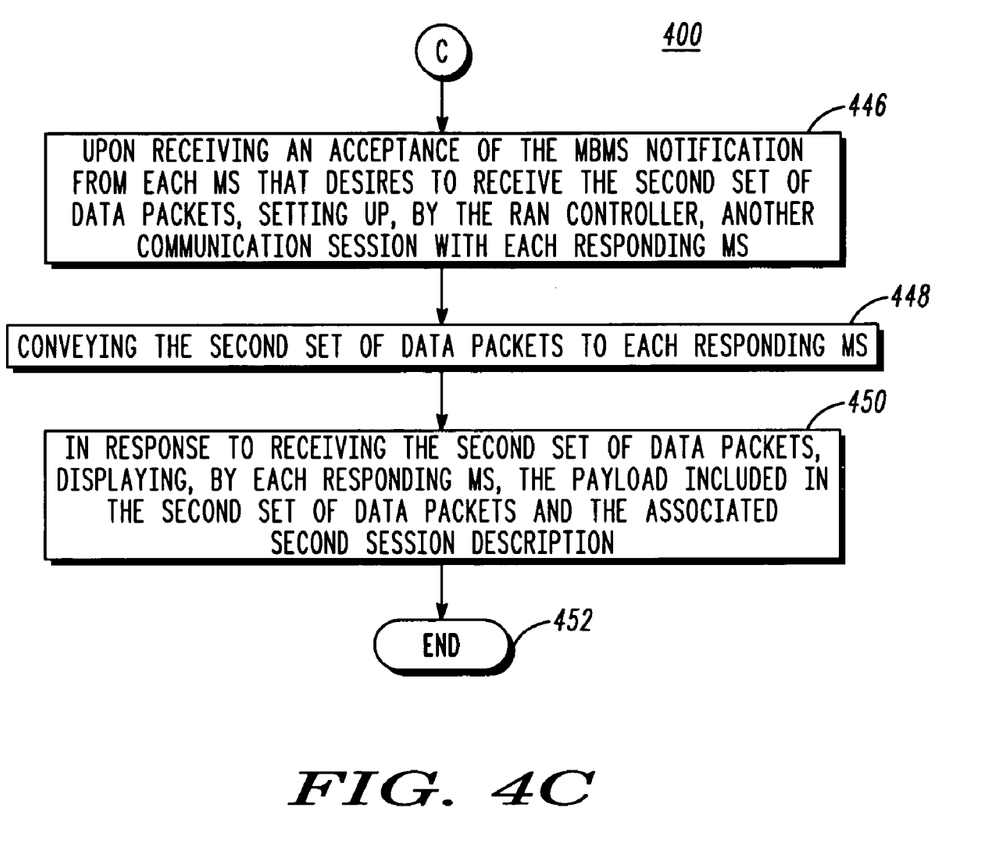
FIG. 4C is a continuation of the logic flow diagrams of FIGS. 4A and 4B depicting a re-conveyance, by the communication system of FIG. 1, of a set of data packets associated with an earlier communication session to an MS of FIG. 1 in accordance with various embodiments of the present invention.

FIGS. 4A, 4B, and 4C depict a logic flow diagram 400 illustrating a re-conveyance, by communication system 100, of a set of data packets associated with an earlier communication session to an MS 102-104 subscribing to the event in accordance with various embodiments of the present invention. Logic flow diagram 400 begins (402) when MBMS content provider 127 conveys (404) a second set of data packets to server 118, wherein the second set of data packets include the payload conveyed in the first set of data packets. In essence, the conveyance of the second set of data packets comprises a re-conveyance of the payload of the first set of data packets. In response to receiving (406) the second set of data packets, server 118 conveys (408) the second set of data packets, along with the Service ID, the temporary ID, and a second Session Description associated with the payload of the second set of data packets, to RAN controller 114. The Service ID and the temporary ID are added to the second set of data packets by server 118 and the second Session Description may be added to the second set of data packets by either server 118 or by MBMS content provider 127.

In response to receiving (410) the second set of data packets and associated Service ID and the temporary ID from server 118, RAN controller 114 broadcasts (412) a second MBMS notification, via transceiver 112 and a downlink control channel, to all MSs serviced by RAN 110. The second notification includes the Service ID associated with the MBMS service and further includes the temporary ID assigned to the subscription group and the second Session Description associated with the second set of data packets.

In response to receiving (414) the second MBMS notification, each MS that is subscribed to the MBMS service and the event that is in idle mode wakes up. In addition, in response to receiving the second MBMS notification, an MS that is subscribed to the MBMS service may either prompt a user of the MS for an instruction as to whether to receive the second set of data packets or may automatically determine whether to receive the second set of data packets.

In one embodiment of the present invention, the MS may automatically determine whether to receive the second set of data packets. In one such embodiment, the MS may automatically accept, that is, consent to receive, all re-broadcasts of MBMS data concerning the event. In such an embodiment, in response to receiving the second MBMS notification and based on instructions maintained in the one or more memory devices 208, the MS automatically conveys (416) a response to the infrastructure 124, and specifically to RAN controller 114, via access channel 136 accepting the notification. Preferably, the response accepting the notification comprises a connection request, preferably a Radio Resource Control (RRC) connection establishment request, requesting an establishment of an MBMS communication channel between the MS and infrastructure 124.

In another embodiment wherein the MS automatically determines whether to receive the second set of data packets, the MS may automatically accept only re-broadcasts of MBMS data that the MS has not previously received. In such an embodiment, in response to receiving the second MBMS notification and based on instructions maintained in the one or more memory devices 208 of the MS, the MS searches the one or more memory devices to determine (418) whether the second Session Description included in the notification matches a Session Description, such as the first Session Description, maintained in the one or more memory devices. When no match is found (420), the MS automatically conveys (422) a response to the infrastructure 124, and specifically to RAN controller 114, accepting the notification. When a match is found (420), that is, when the MS determines that the second Session Description matches a Session Description, such as the first Session Description, maintained in the one or more memory devices 208 of the MS, the MS rejects the notification and does not respond (423) to the notification, that is, does not convey a connection request, and logic flow diagram 400 ends (452).

In still another embodiment of the present invention, instead of automatically determining whether to receive the second set of data packets, the MS may prompt (424) a user of the MS for an instruction as to whether to receive the second set of data packets in response to receiving the second MBMS notification. For example, in response to receipt of the second notification, processor 206 of the MS may retrieve a textual query maintained in the one or more memory devices 208, such as "Do you want to view 'second Session Description'?", wherein the processor inserts the Session Description included in the second notification for the term 'second Session Description' in the prompt. The retrieved message may further include a "Yes" response and a "No" response when the display screen of user interface 210 is a touch screen, or may instruct the user to select one key of a keypad if the user's response is affirmative and to select another key of the keypad if the user's response is negative. Processor 206 then displays the retrieved message on the display screen of user interface 210. The user of the MS may then input (426) an instruction into the MS as to whether to accept the notification, that is, download the second set of data packets, or to reject the notification, that is, not download the second set of data packets, by touching or depressing the indicated softkey or key.

When the MS receives (428) an instruction rejecting the notification, the MS does not respond (430) to the second MBMS notification and logic flow diagram 400 ends (452). By not responding to the second MBMS notification, the MS is not included in the communication channels set up for the conveyance of the second set of data to MSs subscribing to the event. When the MS receives an instruction accepting the notification to the prompt, the MS conveys (432) an acceptance of the notification, preferably a connection request, to RAN controller 114 via access channel 136.

In yet another embodiment of the present invention, when MS prompts (424) a user of the MS for an instruction as to whether to receive the second set of data packets in response to receiving the second MBMS notification, the MS may start (434) a response timer 214 included in the MS. Timer 214 counts down a response period, such as 10 seconds, during which the MS awaits a response to the prompt from a user of the MS. When, in response to the prompt and prior to the timer 214 timing out, the MS receives (436) an instruction accepting or rejecting the notification, the MS either conveys a response to the second notification or does not respond to the notification, whichever is appropriate. When timer 214 times out prior to the MS receiving (436) an instruction accepting or rejecting the notification, the MS enables (438) a default response maintained in the one or more memory devices 208. Preferably, the default response is programmed by the user of the MS, however the default response may be preprogrammed into the MS. When the default response is a rejection of the notification (440), the MS does not respond (442) to the second MBMS notification and logic flow diagram 400 ends (452). When the MS the default response is an acceptance of the notification (440), the MS conveys (444) an acceptance of the notification, preferably a connection request, to RAN controller 114 via access channel 136.

RAN controller 114 waits a predetermined period of time for responses to the second MBMS notification, which period of time is similar to a period of time that the RAN controller may wait for responses to the first MBMS notification. Upon expiration of the predetermined period of time, RAN controller 114 sets up (446) another communication session by establishing a PTM communication channel or PTP communication channels, whichever the RAN controller has determined to establish, for conveyance to each responding MS of the second set of data packets. RAN controller 114 then conveys (448) the second set of data packets to the responding MSs via the established channel or channels. Each MS receiving the second set of data packets displays (450) the second Session Description and the payload, such as the score or video clip, included in the second set of data packets on the display screen of user interface 210, and logic flow diagram 400 ends (452).

By providing a Session Description in the sets of data packets conveyed to the MSs 102-104 associated with subscribers to the MBMS service and in an MBMS notification conveyed to the MSs, communication system 100 permits the MSs to determine whether to receive re-data broadcasts by the MBMS service. An infrastructure 124 included in communication system 100 receives a first set of MBMS data from an MBMS content provider 127 and conveys the first set of MBMS data to each MS 102-104 associated with a subscriber to the MBMS service. Infrastructure 124 then receives a second set of MBMS data from the MBMS content provider, wherein the second set of MBMS data comprises a re-conveyance of the first set of MBMS data, and notifies each MS 102-104 of the second set of data, preferably by conveying an MBMS notification that includes a Session Description associated with the second set of data. Infrastructure 124 then determines whether to convey the second set of data to each MS based on a response, preferably a connection request, received from the MS. When the response indicates a desire of the MS to receive the second set of data, the infrastructure conveys the second set of data to the MS.

In one embodiment of the present invention, each MS subscribing to the MBMS service and the event may automatically determine whether to receive the second set of data. In another embodiment of the present invention, in response to receiving the notification from infrastructure 124, the MS prompts a user of the MS for an instruction as to whether to receive the second set of data. The MS then determines whether to receive the second set of data based on a response of the user to the prompt.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing MBMS data to a subscriber to a Multimedia Broadcast Multicast Service (MBMS) service comprising:
    receiving a first set of MBMS data from an MBMS content provider;
    conveying the first set of MBMS data to a mobile station associated with a subscriber to the MBMS service;
    receiving a second set of MBMS data from the MBMS content provider, wherein the second set of MBMS data comprises a re-conveyance of the first set of MBMS data; and
    conveying an MBMS notification that identifies the second set of MBMS data as a re-conveyance of the first set of MBMS data.

2. The method of claim 1, wherein conveying the first set of Multimedia Broadcast Multicast Service (MBMS) data comprises conveying the first set of MBMS data and a first Session Description to the mobile station.

3. The method of claim 2, further comprising:
    receiving, by the mobile station, the first set of Multimedia Broadcast Multicast Service data and the Session Description; and
    storing, by the mobile station, the first Session Description.

4. The method of claim 2, wherein conveying a Multimedia Broadcast Multicast Service (MBMS) notification comprises conveying an MBMS notification comprising a second Session Description to the mobile station and wherein the method further comprises determining whether to convey the second set of data to the mobile station based on a response of the mobile station to the MBMS notification.

5. The method of claim 4, further comprising determining not to convey the second set of Multimedia Broadcast Multicast Service (MBMS) data to the mobile station when a response to the MBMS notification is not received within a predetermined period of time.

6. The method of claim 4, wherein determining whether to convey the second set of data to the mobile station comprises determining to convey the second set of data to the mobile station when a response to the Multimedia Broadcast Multicast Service notification is received within a predetermined period of time.

7. The method of claim 6, wherein the response to the Multimedia Broadcast Multicast Service notification comprises a connection request.

8. The method of claim 4, further comprising
    receiving, by the mobile station, the Multimedia Broadcast Multicast Service (MBMS) notification comprising the Session Description;
    in response to receiving the MBMS notification, prompting a user of the mobile station; and
    determining, by the mobile station, whether to accept the MBMS notification based on a response of the user to the prompt.

9. The method of claim 8, wherein determining whether to accept the MBMS notification comprises determining not to accept the MBMS notification when the mobile station does not receive an instruction from the user within a predetermined period of time.

10. The method of claim 4, wherein determining whether to convey the second set of data to the mobile station comprises determining not to convey the second set of data to the mobile station based on an absence of a response from the mobile station to the Multimedia Broadcast Multicast Service notification.

11. The method of claim 2, further comprising:
    receiving, by the mobile station, the Multimedia Broadcast Multicast Service (MBMS) notification, wherein the MBMS notification comprises a second Session Description; and
    determining, by the mobile station, whether to receive the second set of MBMS data based on the second Session Description.

12. The method of claim 11, wherein determining, by the mobile station, whether to receive the second set of MBMS data comprises determining, based on the second Session Description, whether to respond to the MBMS notification.

13. The method of claim 12, wherein determining whether to respond to the MBMS notification comprises automatically determining, based on the second Session Description, whether to respond to the MBMS notification.

14. The method of claim 13, wherein determining whether to respond to the MBMS notification comprises:
    receiving, by the mobile station, the Multimedia Broadcast Multicast Service (MBMS) notification comprising a second Session Description;
    determining, by the mobile station, whether the second Session Description received in association with the MBMS notification matches the stored Session Description;
    when the second Session Description matches the stored Session Description, determining not to respond to the MBMS notification; and
    when the second Session Description does not match the stored Session Description, determining, by the mobile station, to convey an acceptance of the MBMS notification.

15. The method of claim 1, wherein the MBMS data is related to an event and further comprising:
    maintains a Service Identifier associated with the Multimedia Broadcast Multicast Service (MBMS) service;
    determining a temporary identifier associated with the event;
    storing the temporary identifier; and
    adding the Service Identifier and the temporary identifier to each of the first set of data and the second set of data.

16. The method of claim 15, further comprising creating a subscription group by maintaining the temporary identifier in association with each mobile station subscribed to receive the session data.

17. An apparatus for providing Multimedia Broadcast Multicast Service (MBMS) session data to a subscriber to the MBMS service comprising a server that receives a first set of MBMS data from an MBMS content provider, conveys the first set of MBMS data along with an associated first Session Description, receives a second set of MBMS data from the MBMS content provider, wherein the second set of MBMS data comprises a re-conveyance of the first set of MBMS data, and conveys the second set of data along with an associated second Session Description, wherein the second Session Description identifies the second set of data as a re-conveyance of the first set of data.

18. The apparatus of claim 17, wherein the session data relates to an event and wherein the server maintains a Service Identifier associated with the Multimedia Broadcast Multicast Service (MBMS) service, determines a temporary identifier associated with the event, stores the temporary identifier, and adds the Service Identifier and the temporary identifier to each of the first set of data and the second set of data.

19. The apparatus of claim 18, wherein the server creates a subscription group by maintaining the temporary identifier in association with each mobile station subscribed to receive the session data.

20. The apparatus of claim 17, further comprising a Radio Access Network (RAN) controller in communication with the server, wherein the RAN controller receives the second set of data along with an associated second Session Description from the server and, in response to receiving the second set of data along and the second Session Description, conveys an MBMS notification comprising the second Session Description to a subscribed mobile station.

21. The apparatus of claim 17, further comprising a Radio Access Network (RAN) controller in communication with to the server, wherein the RAN controller receives the second set of data along with an associated second Session Description from the server, determines whether to convey the second set of data to the mobile station, and in response to determining to convey the second set of data to the mobile station, conveys the second set of data to the mobile station.

22. The apparatus of claim 21, wherein the Radio Access Network controller conveys an MBMS notification comprising the second Session Description to the mobile station and determines whether to convey the second set of data to the mobile station based on a response of the mobile station to the MBMS notification.

23. The apparatus of claim 22, wherein the Radio Access Network controller determines not to convey the second set of Multimedia Broadcast Multicast Service (MBMS) data to the mobile station when a response to the MBMS notification is not received within a predetermined period of time.

24. The apparatus of claim 22, wherein the Radio Access Network controller determines to convey the second set of data to the mobile station when a response to the Multimedia Broadcast Multicast Service notification is received within a predetermined period of time.

25. The apparatus of claim 24, wherein the response to the Multimedia Broadcast Multicast Service notification comprises a connection request.

26. A mobile station capable of accessing a Multimedia Broadcast Multicast Service (MBMS) service, wherein the mobile station comprises:
at least one memory device; and
a processor that receives a first set of MBMS data and an associated first Session Description, stores the first Session Description to produce a stored first Session Description, receives a second Session Description associated with a re-conveyance of the first set of data, compares the stored first Session Description to the second Session Description, and determines whether a conveyance of a second set of MBMS data is a re-conveyance of the first set of MBMS data based on the comparison of the stored first Session Description and the second Session Description.

27. The mobile station of claim 26, wherein the processor further receives a Multimedia Broadcast Multicast Service (MBMS) notification comprising the second Session Description, in response to receiving the MBMS notification, prompts a user of the mobile station, and determines whether to accept the MBMS notification based on a response of the user to the prompt.

28. The method of claim 27, wherein the processor determines whether to accept the MBMS notification by determining not to accept the MBMS notification when the mobile station does not receive an instruction from the user within a predetermined period of time.

29. The mobile station of claim 26, wherein the processor receives a Multimedia Broadcast Multicast Service (MBMS) notification comprising the second Session Description and wherein determining, by the processor, whether to receive the re-conveyance comprises determining, based on the second Session Description, whether to respond to the MBMS notification.

30. The mobile station of claim 29, wherein the processor determines whether to respond to the MBMS notification by determining whether the second Session Description received in association with the MBMS notification matches the stored Session Description, when the second Session Description matches the stored Session Description, determining not to respond to the MBMS notification, and when the second Session Description does not match the stored Session Description, determining to convey an acceptance of the MBMS notification.

31. A mobile station capable of receiving data from a Multimedia Broadcast Multicast Service (MBMS) service, the mobile station comprising:
at least one memory device; and
a processor that receives a first set of MBMS data and an associated first Session Description that is descriptive of a content of the first set of MBMS data, stores the first Session Description to produce a stored first Session Description, receives an MBMS notification comprising a second Session Description that is descriptive of a content of a second set of MBMS data, in response to receiving the MBMS notification, displays a prompt to a user of the mobile station based on the second Session Description, and determines whether to accept the MBMS notification based on a response of the user to the prompt.

32. The mobile station of claim 31, wherein the processor determines whether to accept the MBMS notification by determining not to accept the MBMS notification when the mobile station does not receive an instruction from the user within a predetermined period of time.

* * * * *